(12) United States Patent
Murphy et al.

(10) Patent No.: US 11,062,623 B2
(45) Date of Patent: *Jul. 13, 2021

(54) IMPACT RESISTANT MODULAR BRAILLE DISPLAY DEVICE

(71) Applicant: Freedom Scientific, Inc., Clearwater, FL (US)

(72) Inventors: Patrick Murphy, Lithia, FL (US); Todd Conard, Ruskin, FL (US); Bradley S. Davis, Treasure Island, FL (US); Maarten van Egmond, Rijnsburg (NL)

(73) Assignee: Freedom Scientific, Inc., Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,858

(22) Filed: Jan. 21, 2020

(65) Prior Publication Data

US 2020/0251015 A1 Aug. 6, 2020

Related U.S. Application Data

(63) Continuation of application No. 15/627,599, filed on Jun. 20, 2017, now Pat. No. 10,540,909.

(51) Int. Cl.
*G09B 21/00* (2006.01)
*G06F 3/01* (2006.01)
*G09B 21/02* (2006.01)

(52) U.S. Cl.
CPC .......... *G09B 21/004* (2013.01); *G06F 3/016* (2013.01); *G09B 21/02* (2013.01)

(58) Field of Classification Search
CPC ... G09B 21/00; A61F 9/08; B65D 2583/0413; B41M 3/16; B41J 3/32
See application file for complete search history.

(56) References Cited

U.S. PATENT DOCUMENTS

| 4,266,936 | A | 5/1981 | Rose et al. |
|---|---|---|---|
| 6,417,821 | B1 | 7/2002 | Becker et al. |
| 2004/0110562 | A1 | 6/2004 | Kajino et al. |
| 2004/0197745 | A1 | 10/2004 | Hong et al. |
| 2014/0242555 | A1 | 8/2014 | Murphy et al. |
| 2015/0062018 | A1 | 3/2015 | Naidu et al. |
| 2015/0262509 | A1 | 9/2015 | Labbé et al. |
| 2016/0034180 | A1 | 2/2016 | Labbé et al. |

*Primary Examiner* — Omkar A Deodhar
(74) *Attorney, Agent, or Firm* — GrayRobinson, P.A.; Michael J. Colitz, III (57) ABSTRACT

Disclosed is a braille display that is impact resistant and that employs a modular construction. The impact resistance is achieved, in part, by molded and resilient end caps. Each end cap includes a centrally positioned slit that functions in absorbing lateral impacts to the display. The impact resistance is further achieved by an over molded housing that is positioned about an associated USB connector. The modularity of the display is achieved by way of a subassembly that is releasably secured within the interior of a main housing. The subassembly, in turn, includes a series of cell compartments that are arranged in groups. Each group of cell compartments is controlled by an individual shift register. This allows a grouping cell compartments to be removed and replaced as needed without disturbing the remaining cell components.

12 Claims, 12 Drawing Sheets

IMPACT RESISTANT MODULAR BRAILLE DISPLAY DEVICE

CROSS REFERENCE TO RELATED APPLICATIONS

This application is a continuation of, and claims priority to, co-pending application Ser. No. 15/627,599, filed on Jun. 20, 2017, entitled "Impact Resistant Modular Braille Display Device," now U.S. Pat. No. 10,540,909, issued Jan. 21, 2020, the contents of which is fully incorporated herein for all purposes.

BACKGROUND OF THE INVENTION

Field of the Invention

This disclosure relates to a braille display device. More particularly, the disclosure relates to an impact resistant display device that employs a modular construction.

Description of the Background Art

A braille display is an electromechanical device that connects to a peripheral device, such as a computer or a monitor, by way of a wired or wireless connection. Braille displays are used to convert text characters from the peripheral device into braille characters that can be perceived by a blind or low vision user. Computer software can be used to convert both text and visual images into braille characters that can be read by the user. Braille displays consist of a line of tactile cells. Typical displays include an array of 20, 40, or 80 tactile cells. Each individual cell corresponds to a single braille character consisting of six or eight tactile pins that move up and down in response to an instruction signal. Braille characters are generated by raising certain pins above and keeping others below a tactile surface. The tactile pins can be driven by mechanical, electromechanical, piezoelectric, pneumatic, or magnetic effects. When in the raised position, the pins extend above the tactile surface and can be felt by a user. The cells of the array together represent a line of text. After a line of text has been read the user, the display can be refreshed to allow for additional lines to be presented and read.

Although tactile pins can be driven in a number of different ways, it is well known in the art to drive the pins via piezoelectric reeds or other electromechanical drivers. The instruction signal for an 8 pin cell would include 8 inputs corresponding to an up or down instruction for each pin. These instructions would be provided as corresponding electrical inputs to the electromechanical driver. If piezoelectric reeds are used, the electrical inputs actuate the reeds to cause certain tactile pins to protrude above a tactile surface, thereby allowing a specific braille character to be displayed.

An example of braille display is disclosed by U.S. Pat. No. 6,417,821 to Becker et al. Becker discloses a tactual computer monitor with rows and columns of rectangular cells. Each cell includes four rows and two columns of movable pins that can be read by a blind person. The pins are driven by electromechanical impact drivers.

Another example is disclosed by U.S. Pat. No. 4,266,936 to Rose. Rose discloses a portable braille display unit that is the size of a conventional braille page. Each braille character is displayed by a braille cell module that includes spring actuated pins that are controlled by bimetallic latches. To display the braille characters, an electrical current applied to resistively heat selected bimetallic latches. In response, the bimetallic latches bend and disengage from the pin, allowing a compressive spring to move the pin upwardly through a surface plate to display a braille dot.

The braille cells of the type discussed above are not durable and tend to be fragile. This fragile construction results in the display's malfunctioning upon being dropped or impacted. In particular, impacts to known displays often result in the electromechanical elements becoming misaligned, which in turn, precludes the proper operation of the tactile pins. In some cases, the pins fail to extend above the tactile surface upon actuation, and they likewise fail to fully retract below the surface when disengaged. For this reason, most known display constructions are designed for static, desktop uses. In such environments, the display device is unlikely to encounter the type of impact that could result in a pin misalignment or malfunction. However, this is an increasing need in the art for portable braille displays. And portable braille displays often get jostled, bumped, or dropped in day to day use. This is especially true for blind or low vision users. Even when impacts do not result in a complete malfunction, they otherwise interfere with the strict tolerances that are required to provide an acceptable feel to the reader, as the misalignment of any components can be perceived as static to the blind or low vision user. Even in the absence of shocks and impacts, maintaining the precise positioning and alignment of tactile pins has proven to be very difficult with known display constructions.

Nor do the display designs of the background art lend themselves to ease of repair or maintenance. In particular, accessing the mechanical, electromechanical, or piezoelectric components of the cell is often very difficult, if not impossible. As a result, the failure of any one individual braille cell often requires the wholesale replacement of all the cells in the display. Alternatively, the failure of a single cell can result in the entire display device having to be replaced. The inability to service individual cells, or groups of cells, is problematic as contaminants that build up on the pins must be removed or the pins must be replaced upon excessive wear. Also, as noted above, pins are especially susceptible to damage upon encountering impacts or shocks.

Accordingly, there is a need in the art to improve the construction design of braille displays. And there is a particular need in the art for portable braille displays that are more durable and resistant to impacts. There is also a need for braille displays with modular constructions that allow the displays to be serviced and repaired.

However, in view of the prior art considered as a whole at the time the present invention was made, it was not obvious to those of ordinary skill in this field that the identified improvements should be made nor would it have been obvious as to how to make the improvements if the need for such improvements had been perceived.

SUMMARY OF THE INVENTION

One of the advantages realized by the display of the present disclosure is that it employs an impact and shock resistant construction.

A further advantage is attained by providing a portable braille display that can be dropped or bumped without causing the display to malfunction.

Another advantage of the present braille display is that it utilizes a housing with features that minimizes damage to internal components upon impact.

Another advantage of the disclosed display is that it is constructed in a way that maintains the necessary tolerances of the tactile pins and prevents the pins and associated electromechanical elements from shifting and malfunctioning.

Yet another advantage is realized by constructing the display in a modular fashion and that allows internal components to be accessed.

Another advantage is obtained by providing a display that can be easily serviced and repaired.

A further advantage is achieved by providing a display construction that avoids the wholesale replacement of all the tactile cells in the event one such cell becomes damaged.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

| PARTS LIST | |
|---|---|
| 20 | Braille Display |
| 22 | Main Housing |
| 24 | Subassembly |
| 26 | Front Panel |
| 28 | End Caps |
| 32 | Individual Cell Compartments |
| 34 | Upper Surface of Main Housing |
| 36 | Braille Keys |
| 38 | Cursor Router Keys |
| 42 | Spacer Bar |
| 44 | Rocker Keys |
| 46 | Panning Buttons |
| 48 | Upper Cover of Main Housing |
| 52 | Lower Tray of Main Housing |
| 54 | Bimorph Reeds |
| 56 | Tactile Pins |
| 58 | Tactile Plane |
| 62 | Motherboard |
| 64 | Backplanes |
| 65 | Shift Registers on Backplanes |
| 66 | Battery Housing |
| 68 | Flex Cable for Motherboard |
| 72 | Anchor in End Cap |
| 74 | Slit in End Cap |
| 76 | Molded Opening in End Cap |
| 78 | Male Ridge in Molded Opening |
| 82 | Back of Subassembly |
| 84 | Flex Cables for Shift Registers |
| 86 | Glob Tops |
| 87 | Electrical Connector on Top of Backplane |
| 88 | USB Assembly |
| 90 | USB Connector |
| 92 | Over Molded Housing for USB |
| 94 | Female Channel in USB Housing |
| 96 | Flex Cable for USB Assembly |
| 98 | Snap Lock |
| 100 | Screw |
| 102 | L-Shaped Housing for Snap Lock |
| 104 | Upward Post of Snap Lock |
| 106 | Downward foot of Snap Lock |
| 108 | Bottom Surface of Backplane |
| 112 | Male Electrical Connector on Backplane |
| 114 | Female Electrical Connector on Cell Compartment |

DETAILED DESCRIPTION OF THE PREFERRED EMBODIMENT

This disclosure relates to a braille display that employs a modular construction and that is impact resistant. The impact resistance is achieved, in part, by molded and resilient end caps. Each end cap includes a centrally positioned slit that functions in absorbing lateral impacts to the display. The impact resistance is further achieved by an associated USB connector that is secured within an over molded outer housing. Modularity is achieved by way of a subassembly that is releasably secured within the interior of an outer housing. The subassembly, in turn, includes a series of individual braille cell compartments that are arranged in groups. Each group of cell compartments is controlled by an associated shift register. This allows an individual shift register to be replaced by removing only the associated cell compartments.

Braille Subassembly

Figure 1:
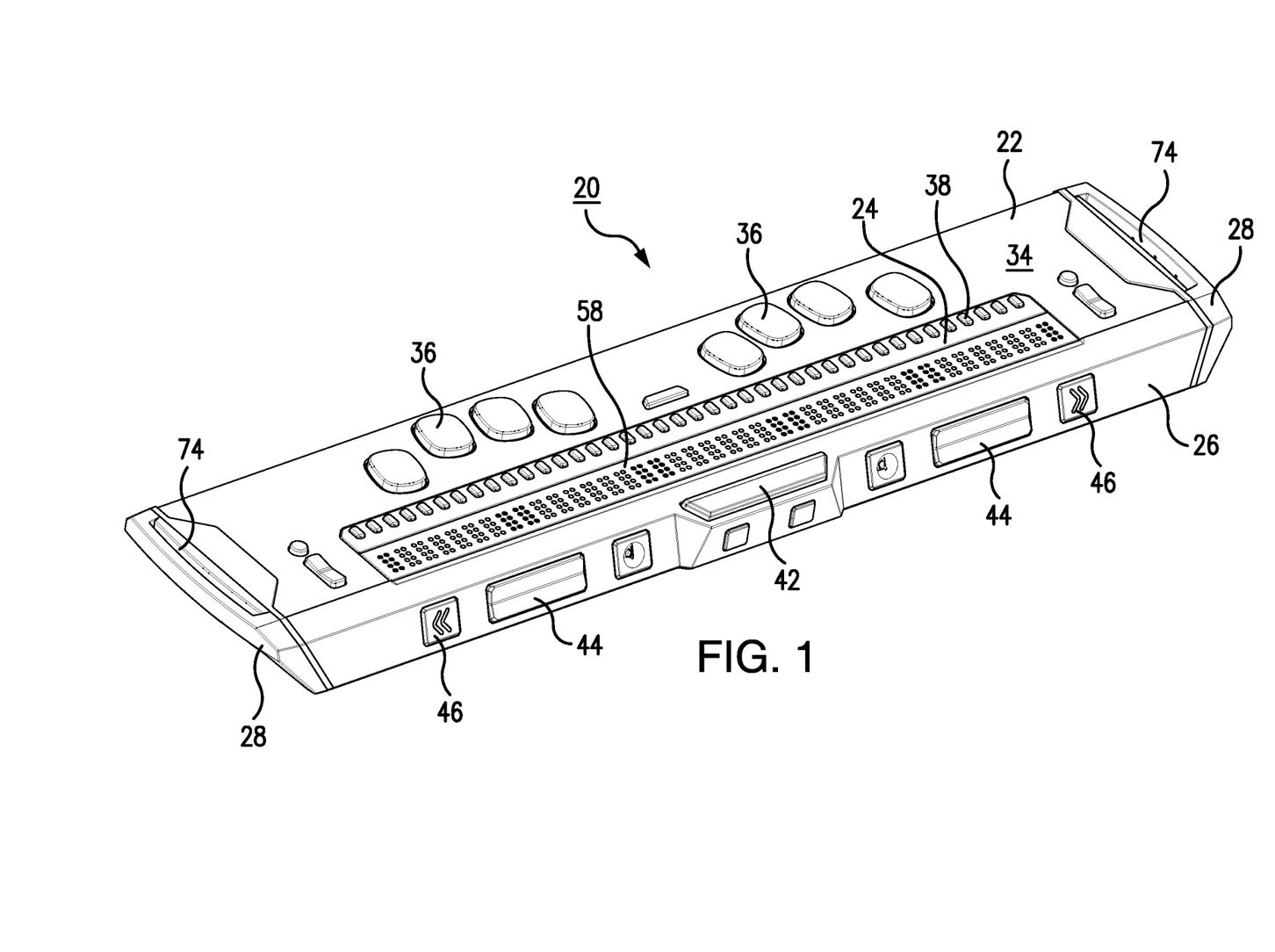
FIG. 1 is a perspective view of the braille display of the present disclosure.

With reference to FIG. 1 the braille display 20 of the present disclosure is illustrated. Display 20 includes a main housing 22, a subassembly 24, a front panel 26, and opposing end caps 28. Subassembly 24, in turn, is formed from a number of discrete braille cell compartments 32. In the depicted embodiment, 40 individual cell compartments 32 are included for generating 40 discrete braille characters.

Main housing 22 includes an upper surface 34 with an array of braille keys 36 and cursor router keys 38. Front panel 26 is releasably secured to the front of main housing 22. Additional control buttons, such as a spacer bar 42, opposing rocker bars 44, and panning buttons 46 are arranged along front panel 26. Those of ordinary skill will appreciate how these controls can be used to orient the cursor of the display. Alternatively, these controls can be assigned unique function as directed by the user.

Figure 2:
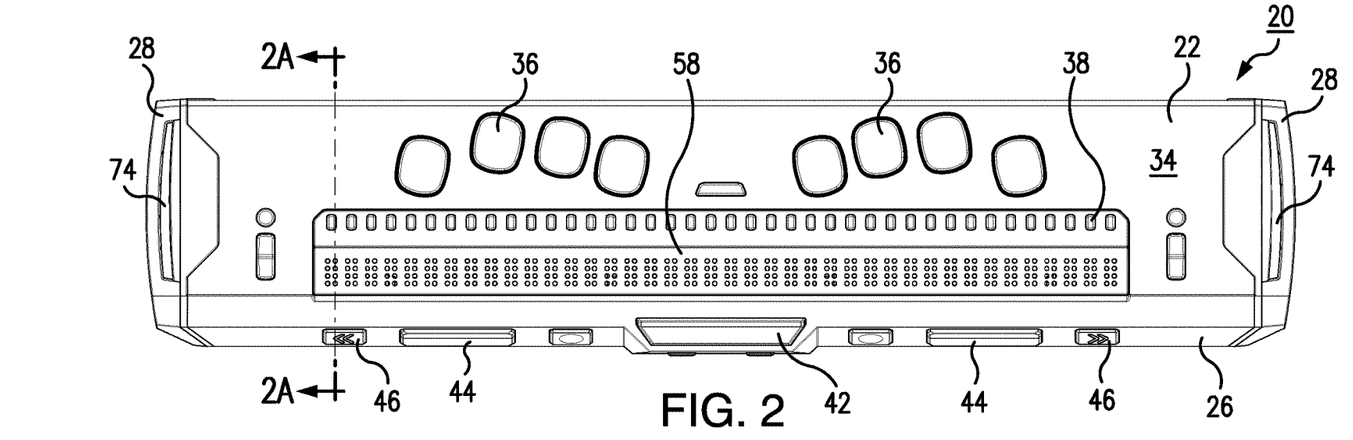
FIG. 2 is a top plan view of the braille display of the present disclosure.
Figure 2A:
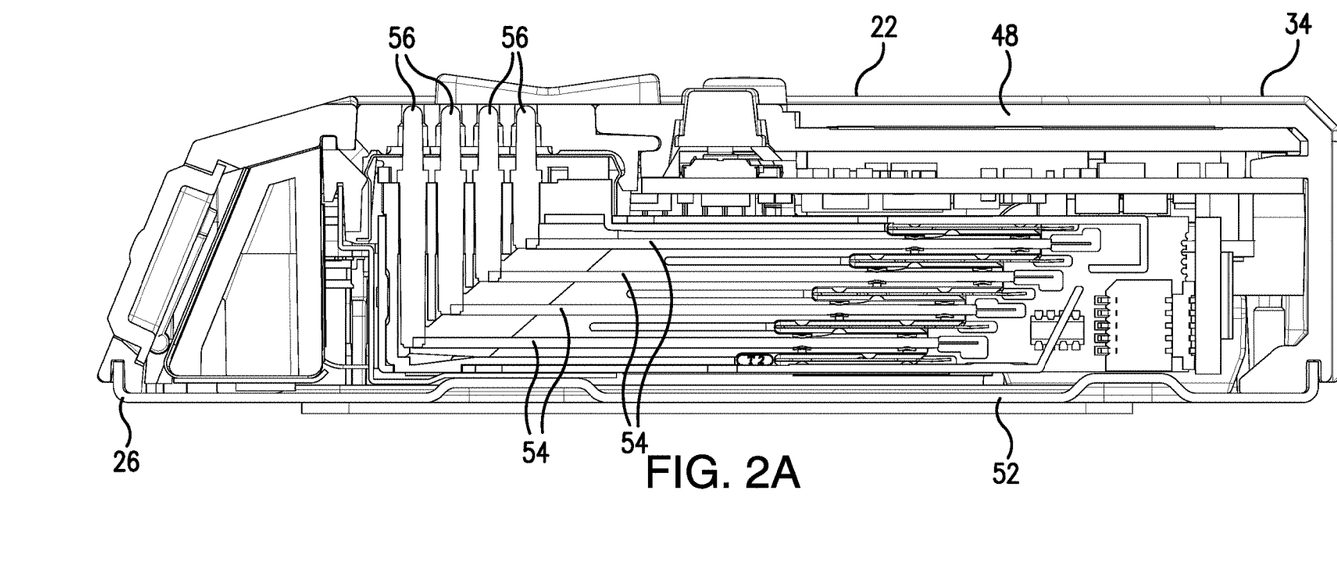
FIG. 2A is a cross-sectional view taken along line 2A-2A of FIG. 2.

With reference to the cross sectional view of FIG. 2A, it can be seen that main housing 22 is formed from two interlocking pieces. Specifically, housing 22 includes an upper cover 48 and a lower tray 52 that can be releasably coupled by way of a friction fit or via a series of peripherally located screws. Main housing 22 includes an interior area and an opening within its forward extent. Subassembly 24 is dimensioned to fit within the interior area of main housing 22. The relationship between main housing 22 and subassembly 24 is best illustrated with reference to the exploded view of FIG. 2B. Namely, by removing front panel 26, subassembly 24 can be accessed and removed. This, in turn, allows individually cell compartments 32 to be accessed for replacement or repair as needed.

Figure 2B:
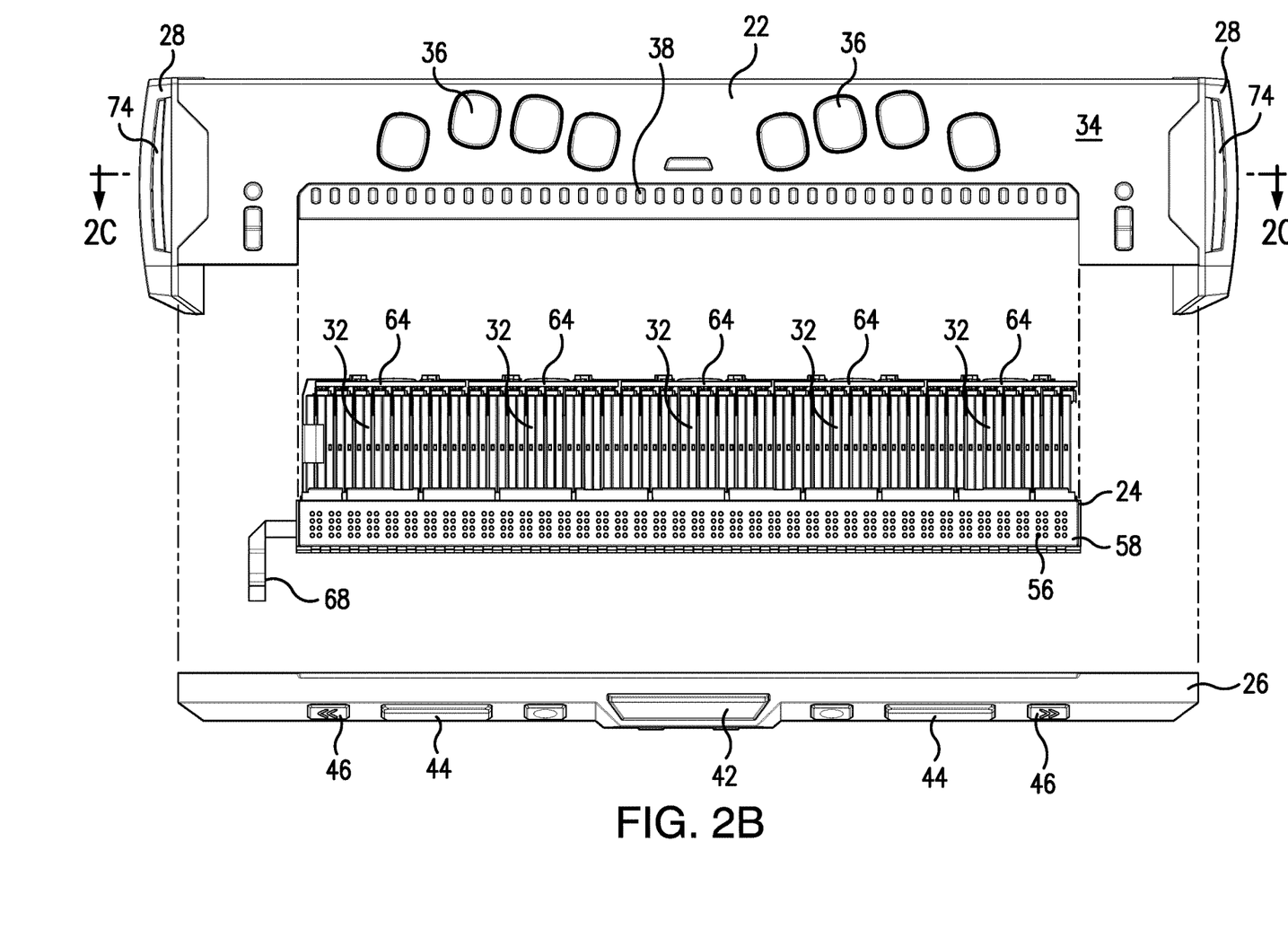
FIG. 2B is an exploded view of the braille display of the present disclosure.
Figure 2C:
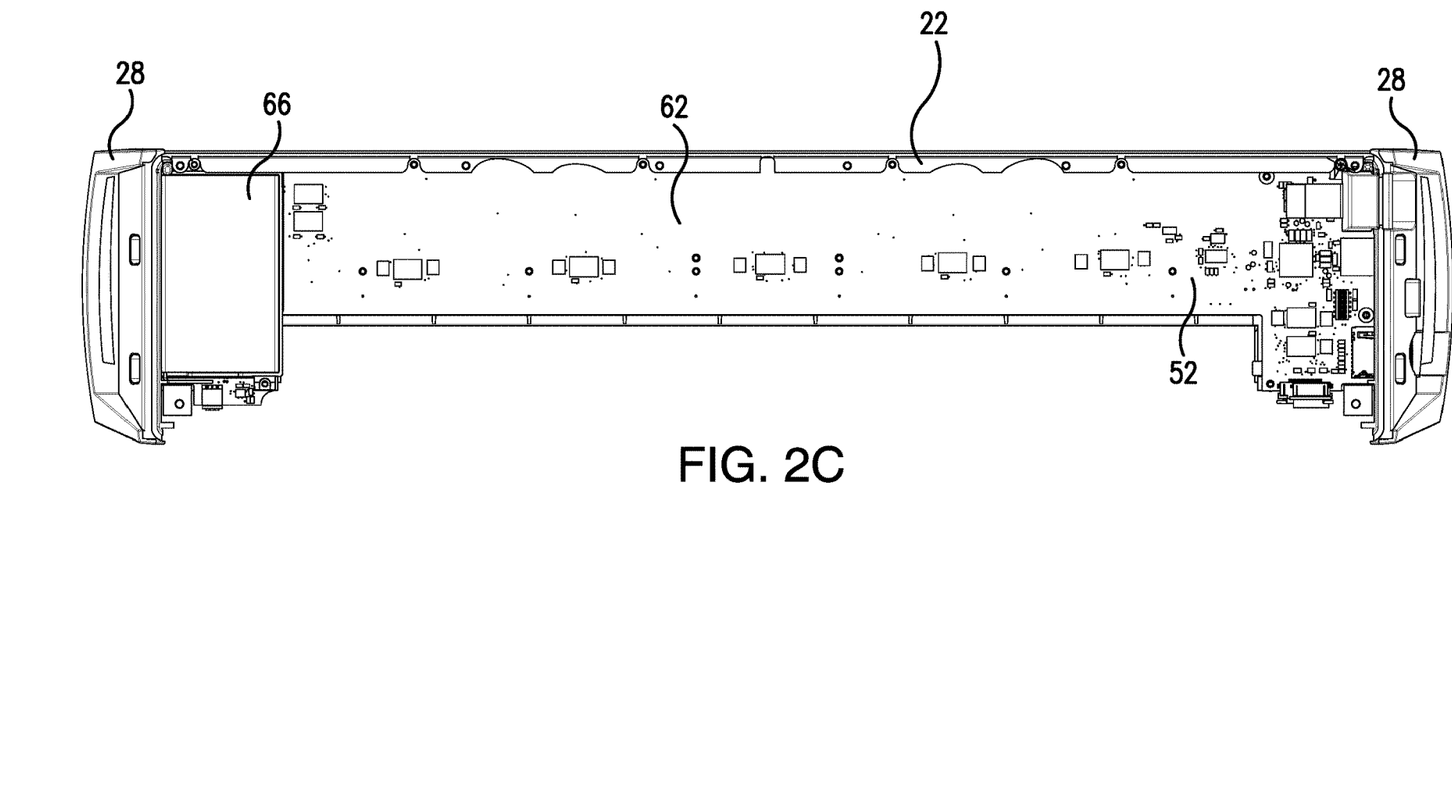
FIG. 2C is a sectional view of the braille display housing taken along line 2C-2C of FIG. 2B.

The depicted subassembly 24 includes a series of 40 interconnected cell compartments. However, this disclosure is not limited to any particular number of cell compartments and those of ordinary skill will appreciate that 20 or 80 cell arrangements would also benefit from the disclosed design. Regardless of the number included, each cell compartment 32 is a fully contained component that includes all the parts needed to generate an individual braille character. In particular, each compartment 32 preferably includes 8 bimorph reeds 54 with associated tactile pins. In the preferred embodiment, 8 reeds 54 are included. A tactile pin 56 is positioned at the end of each reed 54. These pins 56 are registered with apertures formed within a tactile plane 58 at the upper surface of subassembly 24. Tactile plane 58 constitutes a uniform cell cap for the underlying braille cells 32. Plane 58 operates to hold the 40 cells together and in proper alignment. It also presents a uniform and smooth feel to the user. Each cell compartment 32 can be individually driven to display a particular braille character consisting of an eight pin array. However, it is also within the scope of the present disclosure to include cell compartments with six or fewer pins.

For an eight pin array, an instruction set consisting of 8 inputs is provided to an associated cell compartment 32. This instruction set can be provided from a motherboard 62 located within housing 22. The inputs specify the up or down state of each pin 56 in the array, and thus the characteristics of a specific braille character, and the characteristic of a complete braille row. In one aspect of the present disclosure, a series of backplanes 64 are used to route instructions to a subset of cell compartments 32. In the depicted embodiment, the backplanes 64 include an on-board shift register 65, or integrated circuit, that is used to provide instructions to a subset of 8 cell compartments 32. The shift registers 65 are protected via a glob top 86 positioned over top of the backplane 64. Glob top 86 seals the shift register 65 upon the backplane 64 and prevents it from being damaged or contaminated. Thus, the shift register 65 associated with each backplane 64 is capable of providing an instruction set with 64 inputs. For a display with 40 cell compartments (note FIG. 2B), a total of five backplanes 64 with associated shift registers 65 are needed. Nonetheless, the present disclosure is not limited to the use of five backplanes 64, and different numbers of backplanes can be utilized as needed.

The instructions, or inputs, to display 20 will normally be provided to motherboard 62 from an external host device, such as a phone, laptop, desktop, or tablet computer (not shown). The connection between the external device and display 20 can be accomplished via a wired or wireless connection. The host device will translate visible text or graphics into corresponding braille characters. The translation can be accomplished by either the operating system or a screen reader resident on the host device. The braille characters will be expressed as inputs to the cell compartments 32. These inputs are transferred to cell compartments 32 via motherboard 62 and shift registers 62 in a daisy chain fashion (described hereinafter). It is also within the scope of the present disclosure for instructions to be generated from motherboard 62, thereby eliminating the need for an external device.

In one aspect of the disclosure, subassembly 24 is removably positioned within the opening of main housing 22. Main housing 22 also contains a battery housing 66 for storing the battery that supplies power to the motherboard 62 and other internal components of display 20. Housing 66 assists with impact resistance by protecting the power supply from damage. Subassembly 24 is positioned within main housing 22 in such way that it can be easily removed for service and repair. A flex cable 68 preferably provides electrically communication between subassembly 24 and motherboard 62 within main housing 22. Additional fasteners, such as screws or detents, can be provided to releasably, but securely, mount subassembly 24 within main housing 22. Furthermore, as illustrated in FIG. 2B, front panel 26 is positioned over the forward opening of main housing 22 to secure subassembly 24 in place within main housing 22.

End Caps

Figure 8:
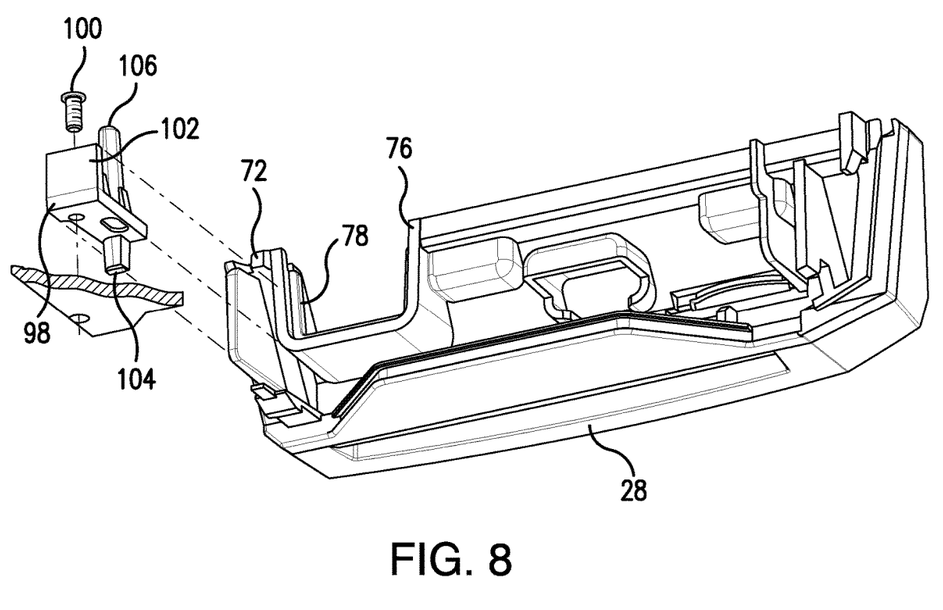
FIG. 8 is an interior view of one of the end caps of the braille display of the present disclosure.

Main housing 22 is further secured by way of a pair of end caps 28. Each end cap 28 includes an interior face that is positioned over one of the first or second ends of main housing 22. A portion of each interior face extends into the main housing. The interior face includes an anchor 72 that is employed in locking the associated end cap 28 in place via a snap lock assembly (described below). Each end cap 28 is overmolded, being formed from two distinct components that are formed in separate processes. The first component is the inner core of the end cap 28. This inner core is formed from a hard plastic that is dimensionally accurate and relatively hard. Suitable materials include any of a variety of impact resistant plastics, such as thermoplastic polymers. Acrylonitrile Butadiene Styrene "ABS" plastics are suitable. ABS/Polycarbonate blends can also be employed. A Cycoloy™ Resin C6600 from SABIC Chemical Manufacturing Company is a preferred material for the inner core. The second component of the end cap 28 is an outer, and softer, housing, that surrounds the inner core. The outer housing is formed from a soft liquid rubber that cures at a relatively low temperature. A thermoplastic polyurethane ("TPU") is preferred for the outer housing. The second material is designed to be soft so as to absorb impacts and reduce shocks to the internal components of the device.

Regardless of the materials used, each end cap 28 is formed with a centrally located slit or opening 74. Opening 74 extends fully through both the inner and outer components of end cap 28. The resilient material of each end cap 28, its enlarged size, and centrally located slit 74, all function in giving the end cap 28 a high degree of resilience. This, in turn, gives display 20 lateral "bumpers." As a result, lateral impacts and bumps can be absorbed by the end cap 28 and are not transferred to main housing 22, or more importantly, the interior components. This, in turn, prevents the bimorph reeds 54, pins 56, and other electromechanical elements from becoming misaligned or damaged. One of the two end caps 28 further includes a molded opening 76 for an electrical connector such as a USB port 90. Opening 76 includes a raised peripheral male ridge 78 that is used in properly aligning the USB connector 90 to housing 22 in a manner described in more detail hereinafter.

Back Planes

Figures 3, 3A, 3B:
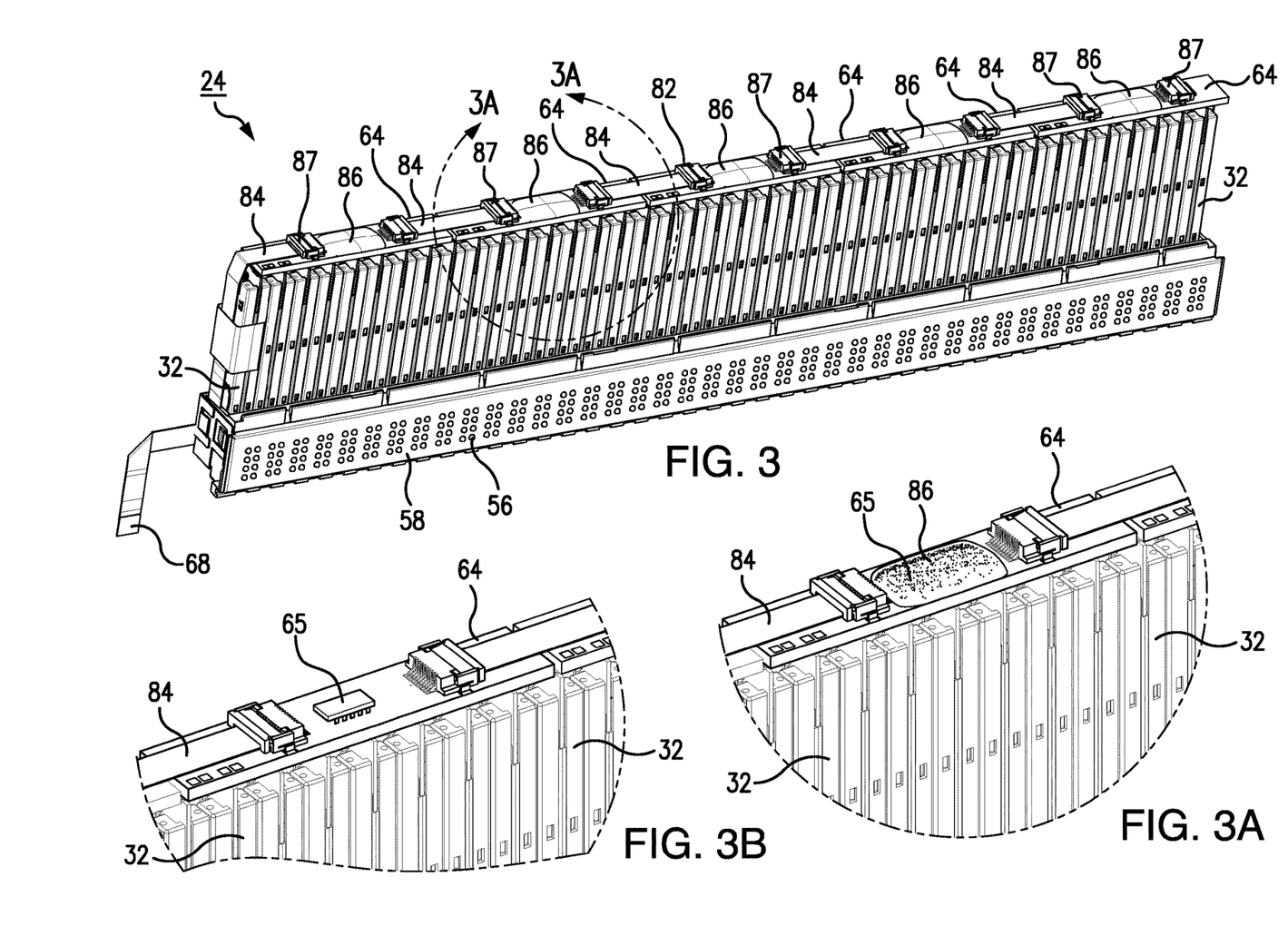
FIG. 3 is a detailed view of the braille display subassembly of the present disclosure.
FIG. 3A is a detailed view taken from FIG. 3.
FIG. 3B is a detail view taken from FIG. 3 with the glob top removed.
Figure 4:
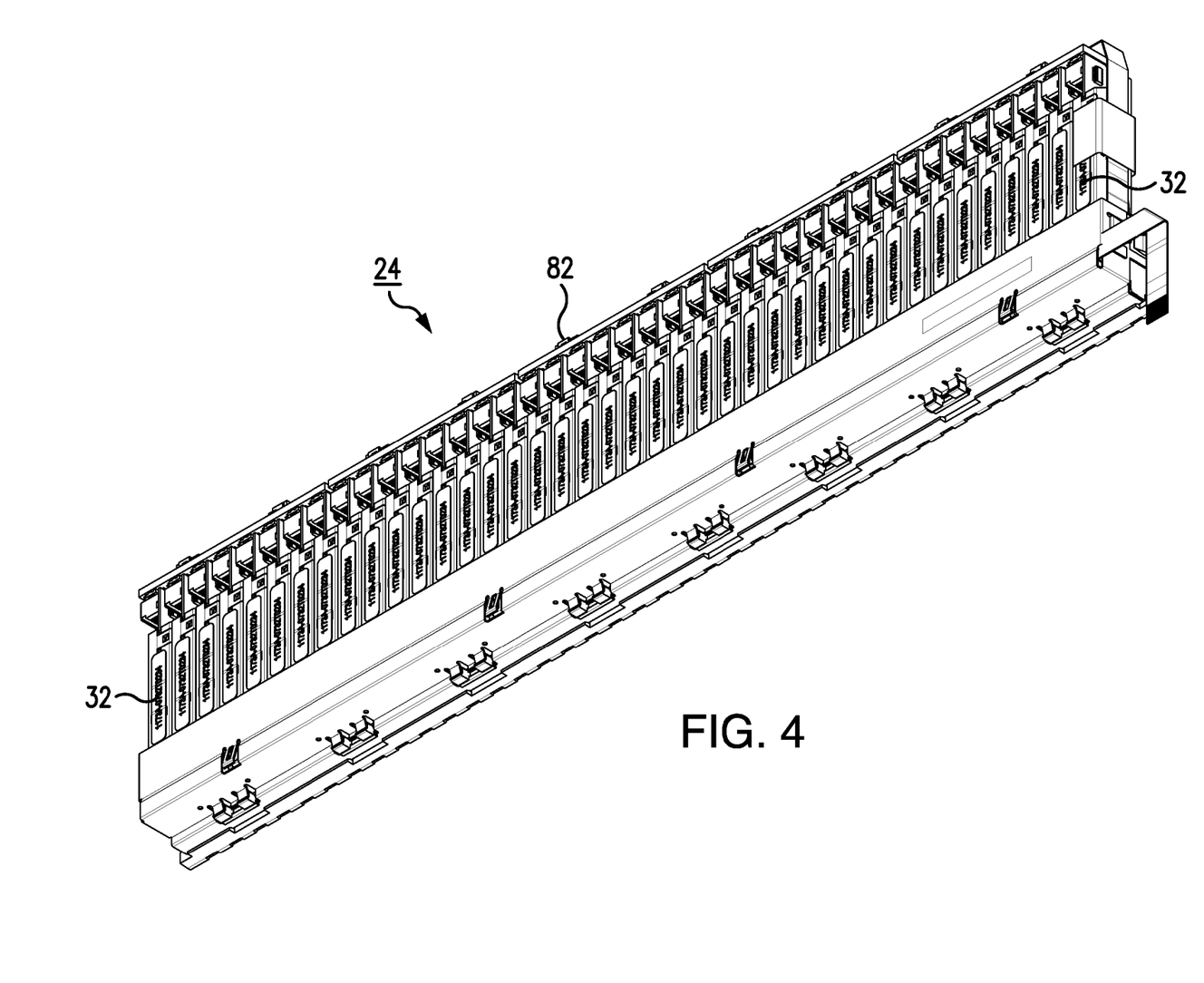
FIG. 4 is an additional view of the braille display subassembly of the present disclosure.
Figure 5:
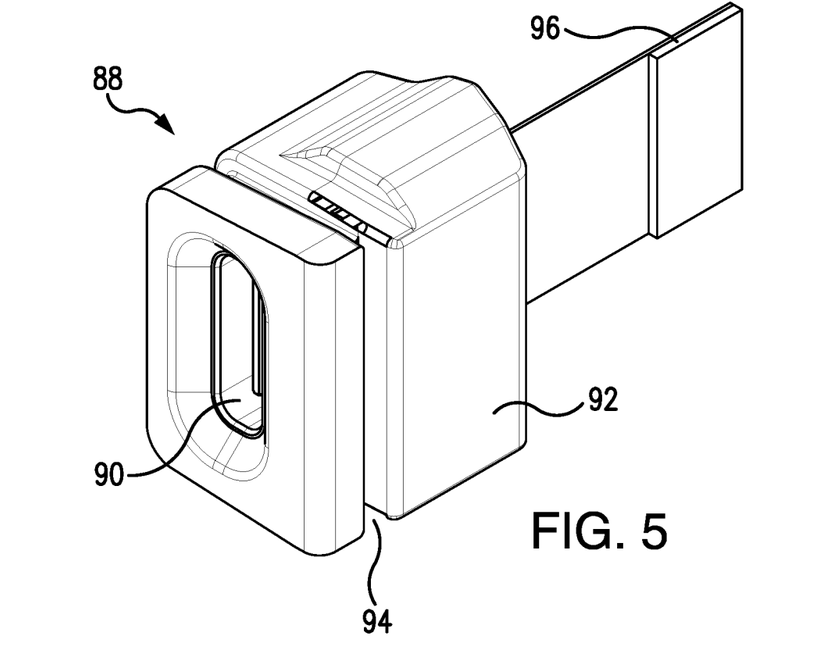
FIG. 5 is a perspective view of the USB assembly of the present disclosure.
Figure 6:
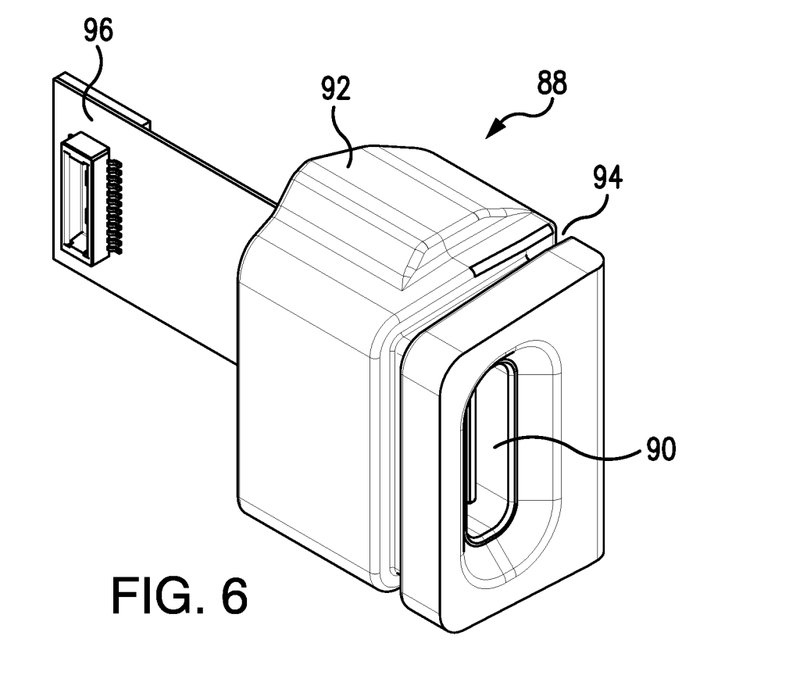
FIG. 6 is a perspective further view of the USB subassembly of the present disclosure.

With reference now to FIGS. 3 and 3A, the back edge 82 of subassembly 24 is depicted. A series of backplanes 64 are equally positioned along back edge 82. In the depicted embodiment, five backplanes 64 are positioned in end to end relationship. The upper surface of teach backplane 64 includes an electoral connector 87 and a glob top 86. As noted, glob top 86 is included to protect an associated shift register 65. Shift register 65 is hidden by glob top 86 in FIG. 3A. However, in FIG. 3B, glob top 86 is removed to illustrate the underlying shift register. Electrical connectors 87 can be used to interconnect adjacent backplanes 64 via flex cables 84. An additional flex cable connects backplanes 64 to the adjacent motherboard 62. In this way, backplanes 64 receive instructions from the motherboard 62 in a "daisy chain" fashion. Flex cables 84 can be uncoupled from one another as needed.

Figure 11:
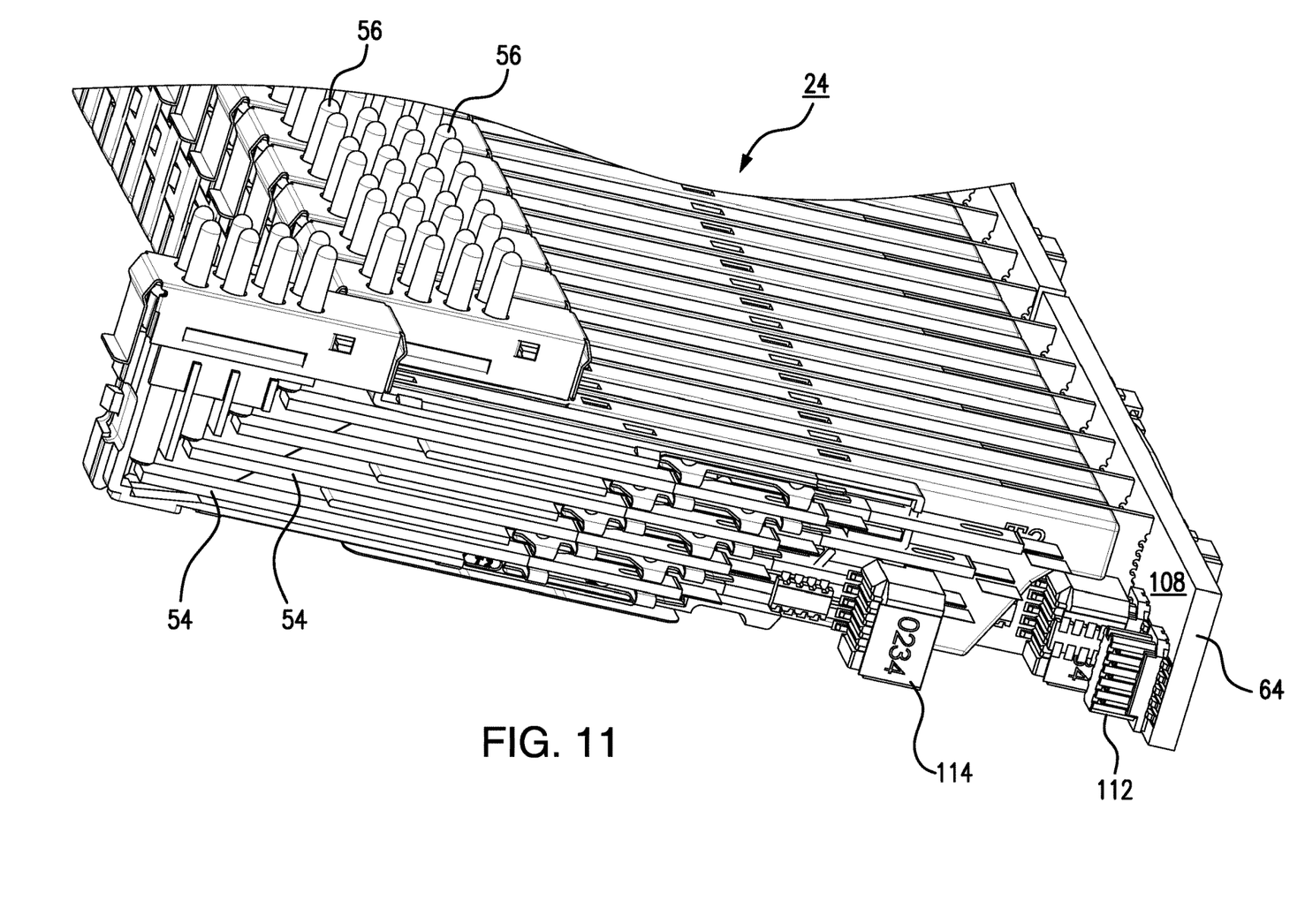
FIG. 11 is a detailed view of the electrical connector positioned upon the underside of one of the backplanes.

Each backplane 64 further includes a bottom surface 108 with a series of male electrical connectors 112. Each of these connectors 112 fits into a corresponding female electrical connector at the end of an associated cell compartment 32. In a preferred but non-limiting embodiment, each backplane 64 includes five male connectors 112 along its bottom face. In this manner, the shift registers 65 associated with the backplanes 64 can transmit instructions from motherboard 62 to the associated tactile cell 32. An individual cell 32 can be selectively unplugged from the bottom of the associated backplane 64 as needed. Since five backplanes 64 are included, and each backplane 64 controls the operation of 8 associated tactile cells 32, a total of 40 cells can be controlled.

The daisy chain connection permits instructions to flow into cell compartments. Once all necessary inputs are received within one shift register, the succeeding instructions flow into the immediately adjacent shift register and so on. If the connection from the subassembly 24 to motherboard 62 is on the right side, shift registers 65 will receive instructions from left to right (when facing the front of display 20). Instructions will be received in the opposite direction if the flex cable is connected to the opposite side of motherboard 62. The precludes the instructions from having to be addressed or associated with a particular shift register or group of tactile cells. This arrangement also allows an individual cell compartment 32 to be removed and replaced from subassembly 24 as needed without disturbing the remaining of the cell components 32. Again, however, the present disclosure is not limited to the use of any particular number of cell compartments 32. The use of fewer than 40 cell compartments would necessarily entail fewer shift registers 64.

USB Assembly

Figure 7:
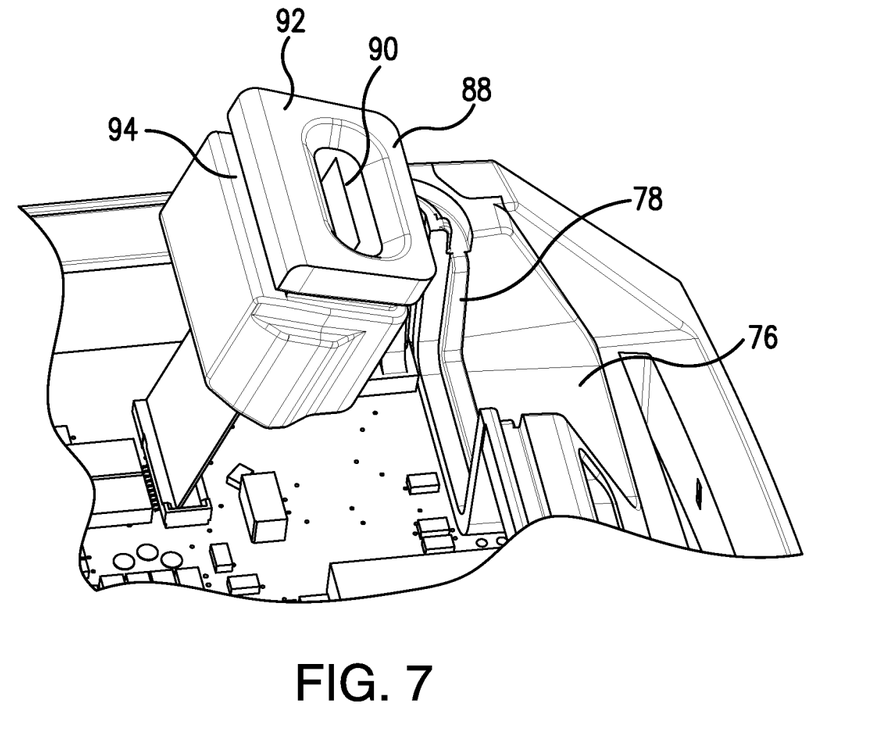
FIG. 7 is a detailed view showing the USB subassembly in position upon the motherboard of the display.

With reference to FIGS. 7 and 8 the USB assembly 88 is described next. USB assembly 88 is employed in both protecting the USB connector 90 from impacts and shocks and also in properly orienting the USB connector 90 within the side of main housing 22. Although this feature is disclosed in connection with a USB connector 90, any number of electrical connectors can be used. These connectors can include, for example, CAT cables, network cables, MGA, VGA, MIDI, or of a variety of other parallel or serial ports. However, in the depicted embodiment, a USB Type C connector 90 is employed. In accordance with the disclosure, the connector is housed within an over molded outer housing 92. Housing 92 is preferably formed from an impact resistant plastic. Any of a variety of thermoplastic polyurethane elastomers (TPUs) can be used. A Pellethane 2363-80AE plastic from Lubrizol Corporation is preferred.

As illustrated, outer housing 92 includes a female channel 94 extending about its peripheral extent. This channel 94 cooperates with the corresponding male ridge 78 within the USB opening 76 in the end cap. This allows the USB connector 90 to be oriented properly with respect to housing 22. Yet, it also affords a limited degree of movement and impact resistance along with the over molded housing 92. Further impact resistance is achieved by connecting the USB connector 90 to motherboard 62 by way of a flex cable 96. This mechanically isolates motherboard 62 from connector 90. All of these features minimize any damage to the connector 90 in the event of impacts or display device 20 being dropped.

Snap Lock Assembly

Figure 9:
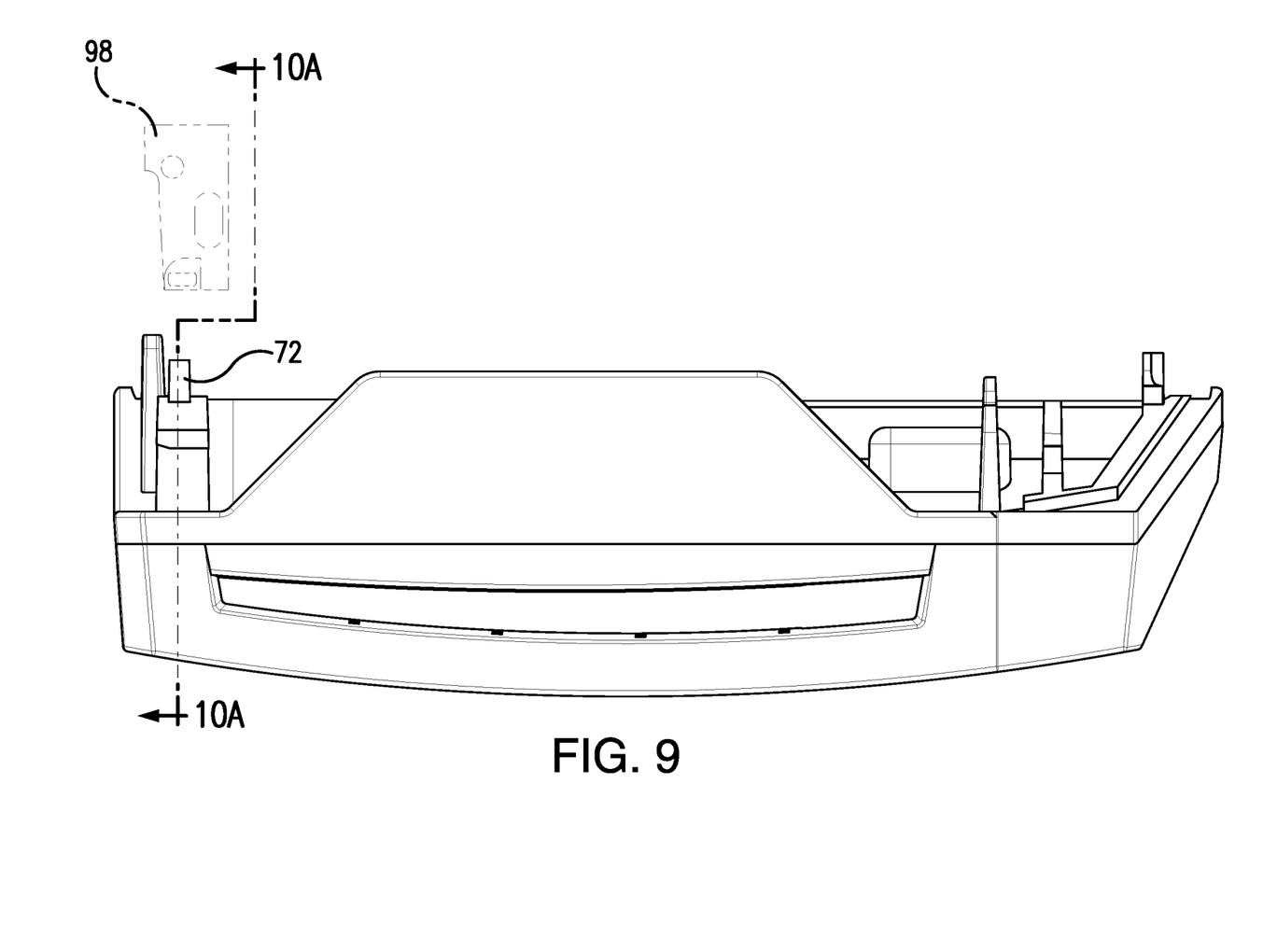
FIG. 9 is a further view of the end cap and the associated snaplock of the present disclosure.
Figure 10A:
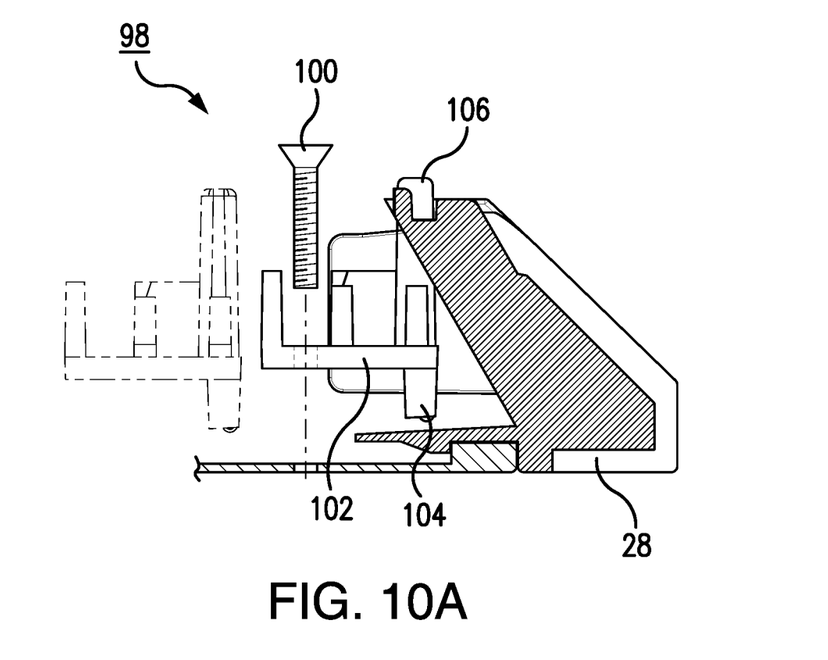
FIG. 10A is a detailed view taken along line 10A-10A of FIG. 9.

The snap lock 98 arrangement is next described in conjunction with FIGS. 9 and 10. Although a single snap lock 98 is depicted, the display utilizes two snap locks 98, one at either end of display 20. Each snap lock 98 ensures that its adjacent end cap is secured to the main housing 22. Snap locks 98 also transfer forces from the upper cover 48, to the lower tray 52 of the housing, and downward to the adjacent anchor 72 in end cap 28. Because peripheral spacing within the device is tight, each snap lock 98 allows associated end cap 26 to be secured without the need for additional bolts or other threaded fasteners. Each snap lock includes an L-shaped housing 102 with both an upwardly extending post 104 and a downwardly extending foot 106. A screw 100 is used to position the snap lock 98 housing 102 within the lower tray 52 of main housing 22. Notably, only a minimal screw force is needed to position housing 102 within tray 52. By affixing screw 100 in this fashion the downwardly extending foot 104 of snaplock 98 impinges upon the anchor 72 of the end cap 26. Once upper cover 48 of main housing 22 is properly fastened (via additional peripheral fasteners), upper cover 48 will apply downward pressure onto upward post 104. This pressure, in turn, applies more force upon downward foot 106 and the underlying anchor 72. All of this positively secures L-shaped housing 102 and associated end cap 28. This allows forces between upper and lower covers (48 and 52) to provide the necessary downward force on anchors 72. This fastens all the major components of display 20, while at the same time eliminating internal fasteners and affording a greater degree of tolerance.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A modular braille display device comprising:
a main housing including an opened forward extent and a closed rearward extent, opposing sides, and an upper plane, an impact resistant end cap positioned over each of the opposing sides, a series of braille keys formed adjacent to the closed rearward extent and positioned within the upper plane, a motherboard positioned within the main housing;

a subassembly positioned within the opened forward extent of the main housing, the subassembly including a series of individual cell compartments, with each cell compartment including a female electrical connector and housing a set of individually actuated braille pins, the subassembly further including a tactile plane with a series of apertures, the braille pins being registered with the series of apertures so that the braille pins can be selectively actuated to extend above the tactile plane and thereby generate an individual braille character to be perceived by a user, the tactile plane being positioned within the upper plane of the main housing;

a series of backplanes, each backplane including a first surface supporting a series of male electrical connectors and a second surface supporting an electrical circuit, a subset of the series of cell compartments being connected to an associated backplane via the female and male electrical connectors, with the subset of cell compartments receiving instructions via the electrical circuit of the associated backplane;

a series of flex cables interconnecting the series of backplanes and the motherboard.

2. The modular braille display device as described in claim 1 wherein each end cap includes a centrally located slit, with each slit functioning as a shock absorber for the end cap.

3. The modular braille display device as described in claim 1 further comprising an anchor formed upon the interior face of each end cap, with the anchor being employed in securing the end cap to the main housing.

4. The modular braille display device as described in claim 1 wherein each individual cell compartment can be removed from the subassembly without disturbing the remaining cell compartments.

5. The modular braille display device as described in claim 1 further comprising a faceplate positioned over the opened forward extent of the main housing for securing the subassembly in place within the main housing.

6. The modular braille display device as descried in claim 1 wherein the flex cables can be uncoupled from the backplanes to facilitate the removal of an individual backplane.

7. A modular braille display device comprising:

a main housing including an opened forward extent, a closed rearward extent, and an upper plane;

a subassembly positioned within the opened forward extent of the main housing, the subassembly including a series of individual cell compartments, with each cell compartment including an electrical connector and housing a set of individually actuated braille pins, the subassembly further including a tactile plane with a series of apertures, the braille pins being registered with the series of apertures so that the braille pins can be selectively actuated to extend above the tactile plane and thereby generate an individual braille character, the tactile plane being positioned within the upper plane of the main housing;

a series of backplanes, each backplane including a first surface supporting a series of electrical connectors and a second surface supporting an electrical circuit, a subset of the series of cell compartments being connected to an associated backplane via the electrical connectors, with the subset of cell compartments receiving instructions via the electrical circuit of the associated backplane.

8. The modular braille display device as described in claim 7 further comprising a series of flex cables interconnecting the series of backplanes.

9. The modular braille display device as described in claim 7 wherein the main housing includes opposing sides and an impact resistant end cap is positioned over each of the opposing sides.

10. The modular braille display device as described in claim 7 further comprising a series of braille keys formed adjacent to the closed rearward extent and positioned within the upper plane.

11. The modular braille display device as described in claim 7 wherein each of the pins is driven via a bimorph reed.

12. The modular braille display device as descried in claim 8 wherein a CPU provides instructions in a daisy chain format to each of the backplanes.

* * * * *